United States Patent Office 3,594,149
Patented July 20, 1971

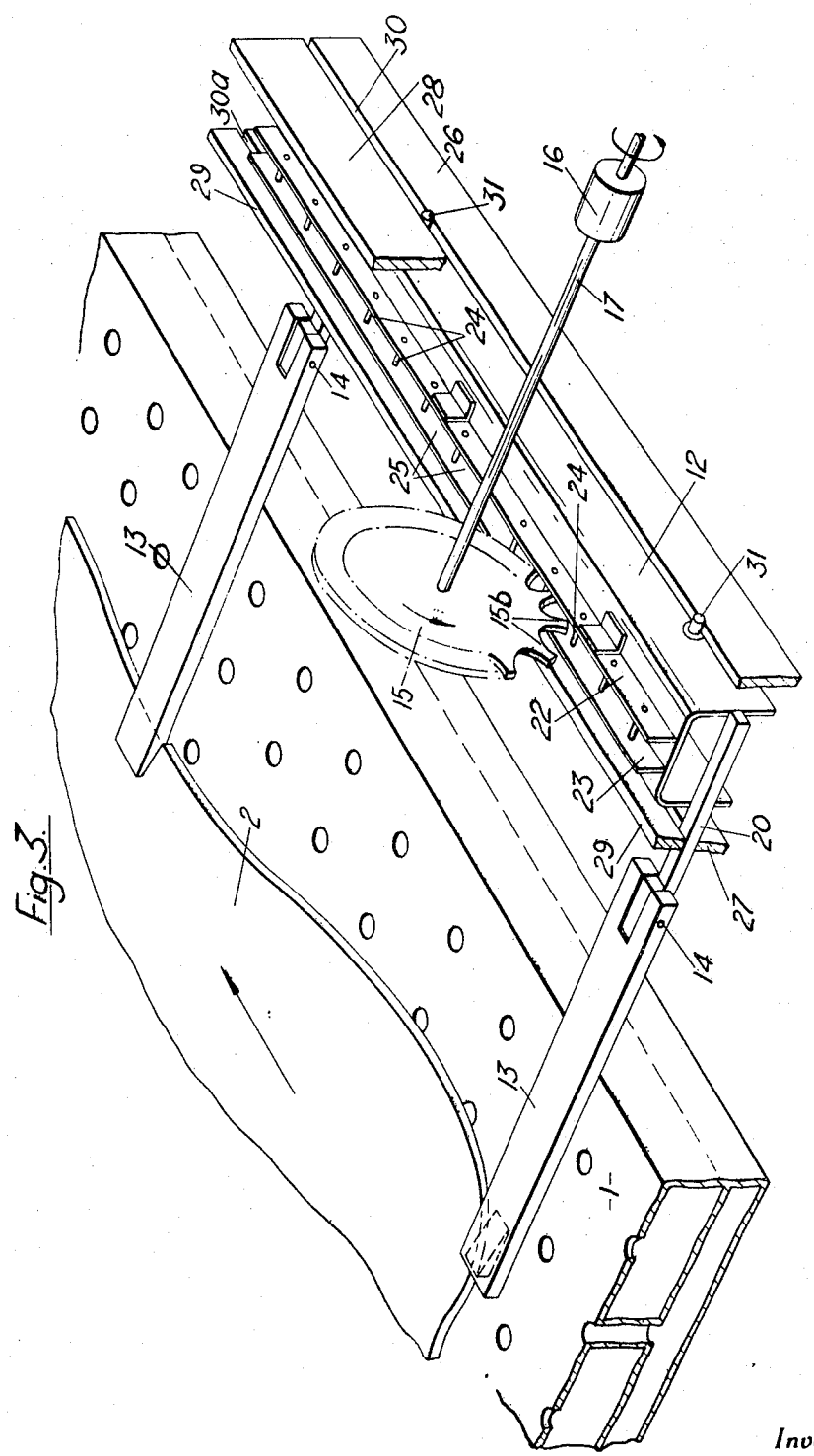

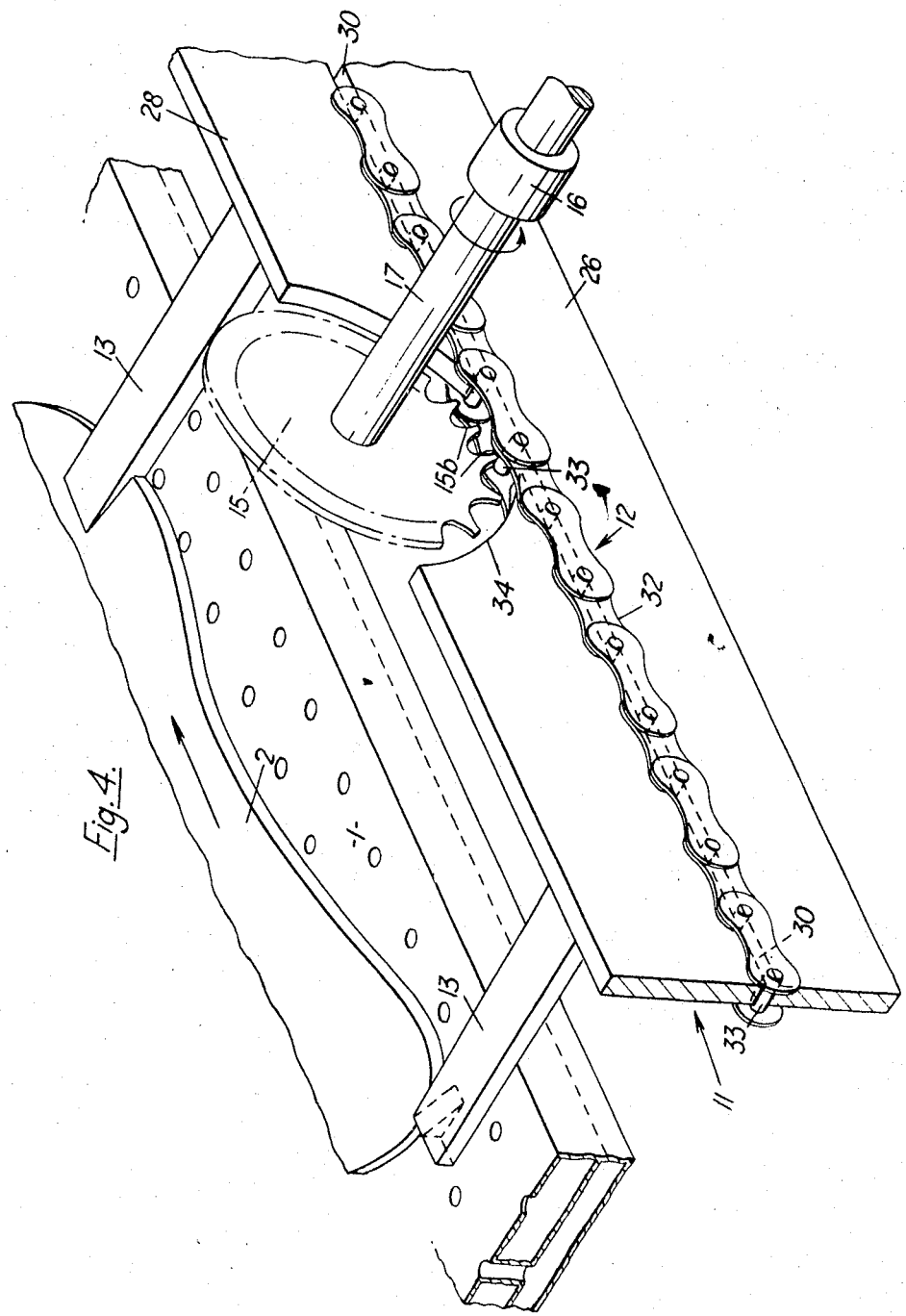

3,594,149
GLASS SHEET CONVEYING APPARATUS
Alan Pickavance and Ronald Charles Freestone, Saint Helens, England, assignors to Pilkington Brothers Limited, Liverpool, Lancashire, England
Filed Oct. 29, 1968, Ser. No. 771,504
Claims priority, application Great Britain, Nov. 3, 1967, 50,063/67
Int. Cl. C03b 29/04
U.S. Cl. 65—182          14 Claims

ABSTRACT OF THE DISCLOSURE

A conveyor for conveying articles such as glass sheets along a path, e.g. through a furnace, at different translational speeds comprises an elongated carriage member which is moved linearly along said path by engagement with successive drive wheels spaced along the path and arranged in at least two sets driven at different rotational speeds. The drives to at least some of the wheels of a set include free-wheel or slipping drive transmission to permit over-running of said wheels during a speed transition of the carriage when moving from one set of drive wheels to another.

BACKGROUND OF THE INVENTION (1) Field of the invention

This invention relates to conveyor apparatus, and more particularly to conveyor apparatus for imparting different translational velocities successively to a body. The invention has particular, but not exclusive application to the conveying of articles, such as glass sheets through a furnace.

When conveying articles through a furnace it is frequently desirable to impart different velocities successively to each article as the article passes through successive zones of the furnace. More generally, in a continuous manufacturing process in which articles are conveyed by conveyor apparatus through and between successive stages of manufacture, it is advantageous to be able to vary the rate of progression of the articles to permit longer treatment at certain stages and/or a more rapid transfer between complementary stages such for example, as a heating stage followed by a quenching stage.

(2) Description of the prior art

A common form of conveyor apparatus for operating in this way is the so-called roller drive in which the articles to be conveyed are engaged directly by rotating drive rollers. Successive rollers or sets of rollers may be rotated at different speeds as required to vary the velocity imparted to the articles.

Thus, for example, in known apparatus for conveying glass sheets through a furnace where the sheets are supported on a gaseous bed the edges of the sheets are engaged by a series of rotating discs which are driven at different speeds in different parts of the furnace to vary the speed of travel of the sheets as required. Such conveyor apparatus, is however, usable only for conveying rectangular shaped glass sheets, and is generally unsuitable for conveying irregularly shaped glass sheets. Thus glass sheets conveyed by the rotating disc drive referred to above must have straight edges in contact with the driving discs to ensure even driving contact along the length of each sheet. Moreover, the transmission of drive directly to the edge of a glass sheet in this way restricts the nature of any forming operations which can be performed on the sheet during its travel through the furnace where the sheet is supported on a gaseous bed: specifically, curvature can be imparted to the sheet only about an axis extending parallel to the edge contacted by the driving discs, and in the direction of travel of the sheet.

For conveying irregularly shaped articles a common method is to engage each article with a drive-transmitting member which is itself displaced in the direction of travel of the conveyor. For example, each drive-transmitting member may be attached to an endless moving chain extending the length of the conveyor. When used for conveying glass sheets through a furnace where the sheets are supported on a gaseous bed, such a conveyor permits greater latitude in the curvature which may be imparted to each sheet, but it is not possible to vary the speed of the conveyor between one part of the furnace and another, unless the conveyor carries only one sheet at a time through the furnace. In order to process a series of glass sheets the conveyor must be run at the maximum speed required for any one stage, for example, in order to ensure that transfer of sheets from a glass bending section of the furnace to a toughening section takes place with the minimum loss of heat, but more particularly so that cooling air is applied almost simultaneously over the whole area of the glass sheet when the latter enters the toughening section. This entails conveying the glass sheets through the remainder of the furnace, for example, through heating and bending sections, at a higher speed than is necessary for satisfactory treatment, and in consequence the length of these sections must be increased to ensure that each sheet spends sufficient time in each section of the furnace at this higher speed. This disadvantage as compared with the variable-speed disc-type conveyor can to some extent be mitigated by arranging for the simultaneous transfer of each glass sheet from one section of the furnace to another at a higher speed, but this necessarily limits the number of sheets which can be accommodated by the conveyor at any one time, and tends to restrict seriously the range of sizes and shapes of glass sheets which may be handled by the conveyor.

It is an object of the present invention to provide conveyor apparatus which, in effect, combines the flexibility as regards speeds of the roller or disc type of conveyor with the flexibility as regards shapes and sizes of conveyed articles of the endless chain type of conveyor.

SUMMARY

According to the present invention there is provided conveyor apparatus for imparting different translational velocities successively to an article, said apparatus comprising a drive transmitting element adapted to engage the article and attached to an elongated carriage member which is linearly displaceable in the direction in which the article is to be conveyed, at least two sets of drive wheels which are spaced apart in said direction and are adapted to engage the carriage member successively to move said member in said direction, means for driving the wheels of each set at selected rotational speeds, and respective free-wheel or slipping drive transmissions between the drive means and at least some of the drive wheels of a set which are driven at a different rotational speed from the drive wheels of an adjacent set to permit each of said drive wheels to have a speed differential relative to its respective drive means when the carriage member is conveyed between the said adjacent sets of drive wheels.

Preferably the elongated carriage member has a plurality of recesses therein which are regularly spaced apart in the direction of travel of the carriage member, each drive wheel having sprocket teeth which engage in succession in said recesses to drive the carriage member on rotation of the drive wheel. Said carriage member may have two parallel longitudinally extending flanges between which bars extend transversely and are spaced at regular intervals in the direction of travel of the carriage member, the sprocket teeth of the drive wheels entering successively the recesses between successive bars to drive the carriage member.

In an alternative construction the carriage member comprises a length of roller chain, the said recesses being constituted by the spaces between successive rollers of the chain.

The carriage member is preferably guided by fixed guide means so that movement of the carriage member can take place in said longitudinal direction only. Thus said guide means may comprise at least two parallel spaced apart guide rails extending in the direction of travel of the carriage member. The carriage member may be provided with at least two guide rollers which are spaced apart in the direction of travel of the carriage member and which are located between said guide rails. Alternatively, the guide rails may engage opposite respective roller surfaces of the roller chain to guide the chain longitudinally, one of the guide rails having recesses formed therein to accommodate the respective drive wheels.

According to one embodiment of the invention at least one of the drive wheels of a set of drive wheels adjacent a set of wheels which move at a different rotational speed is driven at a speed between the speeds of the adjacent sets of wheels.

Each drive transmitting element preferably comprises a finger extending outwardly from the respective carriage member and substantially perpendicularly to the longitudinal axis thereof, each said finger being hinged about an axis parallel to the direction of travel of the carriage member.

The invention also includes a furnace provided with conveyor apparatus as hereinabove defined, arranged to convey articles, for example, glass sheets, through successive zones of the furnace at different respective velocities. The furnace in a preferred embodiment of the invention has a gas hearth on which glass sheets are supported by gaseous jets.

The conveyed articles, for example, glass sheets, are preferably each engaged by two said drive transmitting elements.

BRIEF DESCRIPTION OF THE DRAWINGS

FIG. 3 is a diagrammatic view in perspective of part of the conveyor apparatus in FIGS. 1 and 2, according to one embodiment of the invention, and FIG. 4 is a diagrammatic perspective view similar to that of FIG. 3 of an alternative embodiment of the invention.

DESCRIPTION OF THE PREFERRED EMBODIMENT

Figure 1:
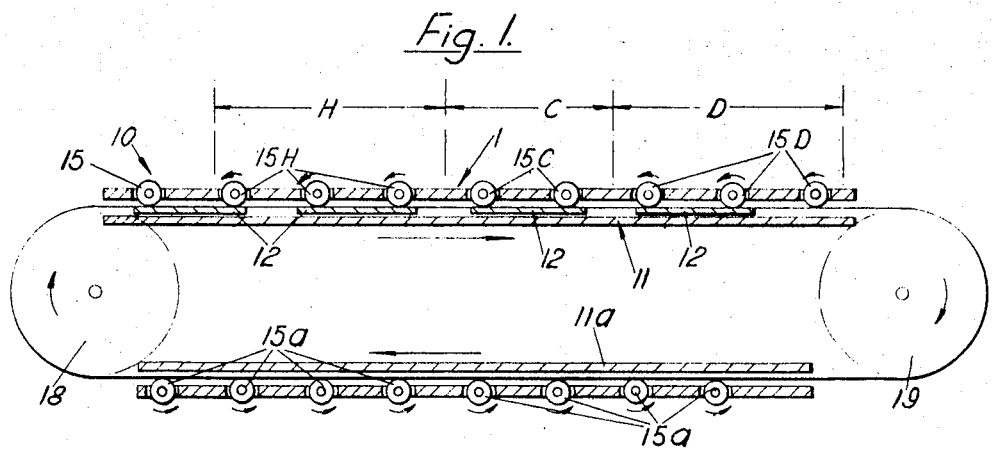
FIG. 1 is a diagrammatic side elevation of conveyor apparatus according to the invention for conveying glass sheets through a furnace for the treatment of the glass sheets.
Figure 2:
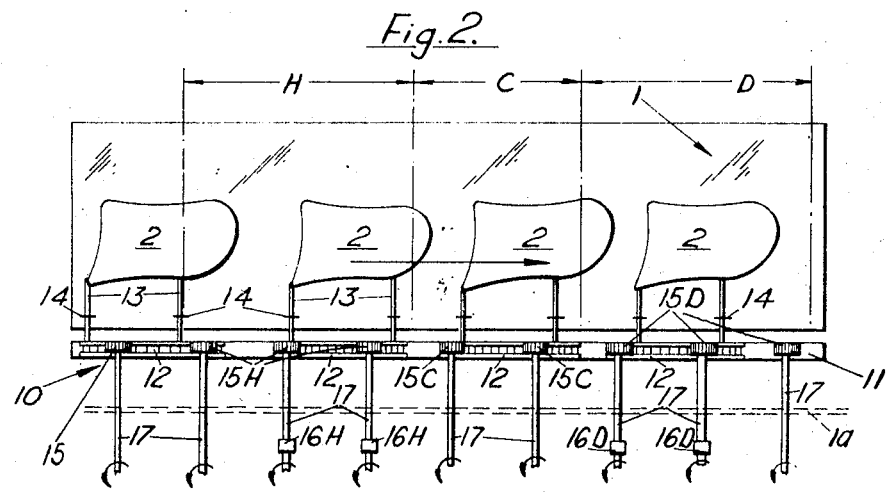
FIG. 2 is a diagrammatic plan view of the apparatus shown in FIG. 1.

FIGS. 1 and 2 show purely diagrammatically, a gas hearth furnace for the treatment, in continuous succession, of glass sheets. The furnace itself is of conventional construction and has a generally horizontal elongated bed 1 on which sheets of glass 2 are supported by upwardly directed jets of hot gas. Thus each glass sheet 2 is supported, in effect, by a cushion of air so that surface marking of the sheet during its heating and forming is avoided. The glass sheets 2 are passed through successive zones of the furnace bed 1, including a heating zone in which each sheet 2 is heated to a temperature at which it is sufficiently supple to effect bending to a requisite shape, the glass sheets 2 being in this example destined to form curved doorlights for motor vehicles. After a final bending stage in the heating zone H the sheets 2 are passed quickly to a cooling or quenching zone C where each sheet is rapidly cooled to effect toughening thereof.

Each glass sheet 2 is conveyed through the heating zone H and the cooling zone C at respective constant speeds, the speed of each sheet 2 in the cooling zone being higher than its speed in the heating zone. Finally, after leaving the cooling zone C the speed of each glass sheet 2 is decreased in a zone D before removal of the sheet from the furnace. For conveying the glass sheets 2 at the requisite speeds through the furnace a conveyor apparatus 10, shown diagrammatically in FIGS. 1 and 2, is disposed along one side of the furnace bed 1 and extends along the entire length thereof.

The conveyor apparatus 10 has a longitudinally extending guide, shown generally at 11 and described in further detail later, along which a plurality of carriage members 12 are guided for movement in a horizontal direction parallel to the bed 1, one carriage member 12 being provided for each glass sheet 2. Attached to each carriage member 12 are drive transmitting elements comprising elongated fingers 13, normally two in number, each of which extends towards and engages a respective sheet 2 at selected points along the adjacent longitudinal edge of the sheet 2. Each finger 13 is removably attached to the respective carriage member 12, the length of each finger 13, and its position on the carriage member, being selected so as to suit the shape of the edge of the respective sheet 2 and the position of the axis about which the sheet 2 is to be curved. Thus the apparatus may readily accommodate sheets 2 of different shapes and sizes. Each finger 13 is attached to the respective carriage member 12 by a horizontal hinge 14 for rocking movement in a vertical plane about an axis parallel to the direction of travel of the carriage member 12. One of the fingers 13 on each carriage member 12 also engages the rear transverse edge of the respective glass sheet 2 to assist in propelling the sheet 2 along the bed 1.

A plurality of drive wheels 15 are spaced at equal intervals along the carriage guide 11, the drive wheels 15 being rotatable about fixed parallel horizontal axes extending perpendicular to the direction of travel of the carriage members 12, and all the drive wheels 15 being disposed in a common vertical plane. As hereinafter described in greater detail with reference to FIGS. 3 and 4, the edge of each drive wheel 15 engages respective carriage members 12 successively to drive the carriage members 12 forward along the guide 11, the interval between adjacent drive wheels 15 being less than the length of each carriage member 12. Thus a continuous drive is imparted to the carriage members 12.

The drive wheels 15 disposed in the cooling zone C, labelled 15C, are driven at a common rotational speed which is higher than that with which the drive wheels 15H in the heating zone H and the drive wheels 15D in the zone D are driven. For this purpose separate driving motors (not shown) may be connected, for example by respective chain drives, to the respective group of drive wheels 15 in each respective zone. Alternatively a common driving motor may be provided and arranged, for example by appropriate gearing or chain sprockets, to drive each respective group of drive wheels 15. Respective free-wheel devices 16H, 16D are connected in the drive inputs to certain of the drive wheels 15H, 15D, as illustrated diagrammatically, each free-wheel device 16 being arranged to permit over-running of the respective drive wheel 15 relative to its drive input in the direction of drive of the respective wheel 15, as indicated by the arrows on wheels 15H, 15D in question. In the embodiment illustrated in FIGS. 1 and 2 the two drive wheels 15H, 15D which are closest to the cooling zone C in the respective zones H, D are provided with free-wheel devices 16. A suitable free-wheel device is described and illustrated in U.S. patent specification No. 1,848,153 (J. C. Blair).

Each drive wheel 15 has a respective driving shaft 17 which extends outwardly through a respective hole in the furnace wall, the position of the latter being indicated by broken lines 1a in FIG. 2. Where free-wheel devices 16 are provided they are connected to the respective shafts 17 outwardly of the furnace wall, so that they are disposed in a relatively cool region.

As a glass sheet 2 passes from the zone H, in which it is driven at a speed typically between ¾ and 1½ inches per second, into the zone C in which it is driven at, for example 6 inches per second, the leading edge of the respective carriage member 12 is engaged by the first drive wheel 15C and immediately accelerates to the higher translation speed, the or each drive wheel 15H in engagement with the remainder of the said carriage member 12 over-running its respective drive shaft 17 by virtue of the free-wheel devices 16H. When the carriage member 12 has ceased to be engaged by the drive wheels 15H, the latter slow down by friction until they are again rotating at their normal speed with their respective freewheel devices 16H inoperative. Similarly, when a sheet 2 passes from the zone C to the zone D the free-wheel devices 16D over-run their respective drive shafts 17 until the sheet 2 is completely clear of the drive wheels 15C, when the sheet 2 is rapidly slowed down by friction to the speed of the drive wheels 15D.

The free-wheel devices 16 could if desired be replaced by slipping clutches or other slipping drive transmissions to permit the respective drive wheel 15 to have a speed differential relative to its respective shaft 17.

In a modification of the basic arrangement illustrated in FIGS. 1 and 2 the velocity transitions between successive zones of the furnace bed 1 may be effected in a series of small steps. For example, if the final drive wheel 15H in the heating zone H which does not have a freewheel device 16 has a fixed rotational speed equivalent to a carriage speed of ¾ inch per second, the succeeding drive wheels 15H with free-wheel devices 16H may be driven at successively increasing speeds corresponding to carriage speeds of ¾, 1½, 3 and 6 inches per second respectively. The carriage members 12 and the glass sheets 2 carried thereby are therefore accelerated in uniform steps from ¾ inch per second to 6 inches per second in passing from the heating zone H to the cooling zone C, and there is, in consequence, less likelihood of the sheet 2 becoming detached from the respective fingers 13 by the speed transition.

The carriage members 12 are returned by the conveyor apparatus 10 after passing through the furnace bed 1 along a return guide 11a by further drive wheels 15a, the guide 11a and drive wheels 15a being similar to the guide 11 and drive wheels 15 respectively and being disposed either below the bed 1, as in FIG. 1, or above the bed 1. The carriage members 12 are conveyed between the guides 11, 11a by large sprocket wheels 18, 19 at each end of the guides 11, 11a, both of said sprocket wheels 18, 19 being driven at a constant speed either separately, or by the common drive as mentioned previously. Suitable means for passing the succession of carriage members 12 around the sprocket wheels 18, 19 are described and illustrated in U.S. patent specification No. 2,936,875 (U. Van Kritter et al.).

One of the carriage members 12 according to one embodiment of the invention is shown in detail in FIG. 3. The carriage member 12 is a metal bar having an inverted channel section. The respective fingers 13 are attached by the respective hinges 14 to the extremities of projecting rods 20 which are attached to the carriage member 12 and extend perpendicularly to the longitudinal axis thereof. Each finger 13 has a width relative to its thickness such that it presents a similar mass distribution to that of a supported glass sheet 2 in planes parallel to the furnace bed 1. In this way the fingers 13 are to a large extent supported by the upwardly directed jets of gas from the bed 1.

Along its upper surface the carriage member 12 is provided with two parallel longitudinally extending upstanding flanges 22, 23 between which are located, at regularly spaced longitudinal intervals, transversely extending cylindrical bars, 24. Regularly spaced recesses 25 are defined between adjacent bars 24 and the drive wheels 15, only one of which is shown, are provided with sprocket teeth 15b on their outer periphery which, on rotation of the wheels 15, engage in successive recesses 25 to impart a linear drive to the carriage member 12. The linear displacement of the carriage member 12 is guided by the guide 11 (FIG. 1) which in the embodiment of FIG. 3 consists of two pairs of horizontal guide rails 26, 28 and 27, 29, each spaced apart vertically by respective guide slots 30, 30a, which are disposed on either side of the carriage members 12. Each carriage member 12 has two pairs of flanged guide rollers 31, only one pair of which is shown, on either side of the carriage member 12, each pair of guide rollers 31 being rotatable about a horizontal axis perpendicular to the direction of travel of the carriage member 12 and being located in the respective slots 30, 30.

The carriage members 12, instead of having the spaced cylindrical bars 24, may be provided with a longitudinally extending rack of substantially triangular shaped gear teeth, which are engageable with the sprocket teeth 15b of the drive wheels 15.

An alternative construction is illustrated in FIG. 4. The carriage guide 11 in this embodiment comprises two vertically spaced longitudinally extending horizontal guide rails 26, 28, defining a guide slot 30 therebetween. Each carriage member 12 in this embodiment comprises a length of roller chain 32 the rollers 33 of which are disposed with their axes horizontal and are located as a sliding fit in the giude slot 30. The chain 32 carries hinged glassengaging fingers 13 which are similar to those of the embodiment of FIG. 3. In this embodiment the rollers 33 of the chain 32 take the place of the cylindrical bars 24 of the embodiment of FIG. 3. Sprocket teeth 15b on the drive wheels 15 engage in the recesses between successive rollers 33 on rotation of the wheels 15 to drive the roller chain 32 longitudinally. Rspective recesses 34 are formed in one of the guide rails, in this case the upper rail 28, to accommodate each respective drive wheel 15.

It will be appreciated that the present invention may be employed to produce step-wise speed transitions at any desired regions in the conveyor apparatus, for example, at loading or unloading stations.

I claim:

1. Apparatus for conveying a succession of glass sheets through successive stages at different respective velocities, comprising at least one drive transmitting element adapted to engage each glass sheet, a succession of carriage members, one for each glass sheet, to which said drive transmitting elements are attached, each drive transmitting element extending substantially perpendicularly to the longitudinal axis of the respective carriage member, and each carriage member being longitudinally displaceable in the direction in which the glass sheet is to be conveyed and having a plurality of recesses therein which are regularly spaced apart along its length, a set of drive wheels for each said stage through which the glass sheets are to be conveyed, each drive wheel having sprocket teeth which engage in succession in said recesses of the carriage members on rotation of the drive wheel to drive the carriage members successively and to move the carriage members in said direction whereby the glass sheets are conveyed through each stage, means for driving the drive wheels of each set at selected rotational speeds, and respective slipping drive transmissions between the drive means and at some of the drive wheels of a set which are driven at a different rotational speed from the drive wheels of an adjacent set to permit each of said drive wheels to have a speed differential relative to its respective drive means when each carriage member is moved between the said adjacent sets of drive wheels.

2. Apparatus as claimed in claim 1, in which each carriage member has two parallel longitudinally extending flanges between which bars extend transversely and are spaced at regular intervals in the direction of travel of the carriage member, the sprocket teeth of the drive wheels entering successively the recesses between successive bars to drive the carriage member.

3. Apparatus as claimed in claim 1 in which each carriage member comprises a length of roller chain, the said recesses being constituted by the spaces between successive rollers of the chain.

4. Apparatus as claimed in claim 1, in which each carriage member is guided by fixed guide means so that movement of the carriage member can take place in said longitudinal direction only.

5. Apparatus as claimed in claim 4, in which the guide means comprise at least two parallel spaced apart guide rails extending in the direction of travel of the carriage member.

6. Apparatus as claimed in claim 1, in which each carriage member has two parallel longitudinally extending flanges between which bars extend transversely and are spaced at regular intervals in the direction of travel of the carriage member, the sprocket teeth of the drive wheels enter successively the recesses between successive bars to drive the carriage member, the guide means comprises at least two parallel spaced apart guide rails extending in the direction of travel of the carriage member, and the carriage member is provided with at least two guide rollers which are spaced apart in the direction of travel of the carriage member and which are located between said guide rails.

7. Apparatus as claimed in claim 1, in which each carriage member comprises a length of roller chain, the said recesses being constituted by the spaces between successive rollers of the chain, the guide means comprises at least two parallel spaced apart guide rails extending in the direction of travel of the carriage member, which guide rails engage opposite respective roller surfaces of the roller chain to guide the chain longitudinally, one of the guide rails having recesses formed therein to accommodate the respective drive wheels.

8. Apparatus as claimed in claim 1, in which at least one of the drive wheels of a set of drive wheels adjacent a set of wheels which move at a different rotational speed is driven at a speed between the speeds of the adjacent sets of wheels.

9. Apparatus as claimed in claim 1, in which each drive transmitting element comprises a finger extending outwardly from the respective carriage member and hinged about an axis parallel to the direction of travel of the carriage member.

10. Apparatus as claimed in claim 1, in which the drive wheels are spaced apart at equal intervals less than the longitudinal extent of each carriage member.

11. Apparatus as claimed in claim 1, in which a common drive is connected to all the drive wheels.

12. Apparatus as claimed in claim 1 including a furnace provided with conveyor apparatus, for conveying articles through successive zones of the furnace at different respective velocities.

13. Apparatus as claimed in claim 12 for heating glass sheets successively, said zones comprising at least a heating and a cooling or quenching zone arranged sequentially.

14. Apparatus as claimed in claim 13, in which the furnace has a gas hearth upon which glass sheets are supported by gaseous jets as they are conveyed through the furnace, and in that the drive wheels and the carriage members are spaced apart along at least one side of the gas hearth whereby the drive transmitting elements are capable of engaging a succession of glass sheets supported by the gaseous jets.

References Cited
UNITED STATES PATENTS

| | | | |
|---|---|---|---|
| 1,848,153 | 3/1932 | Blair | 65—96 |
| 3,399,042 | 8/1968 | McMaster et al. | 65—182A |
| 3,485,616 | 12/1969 | Nitschke | 65—182A |

ARTHUR D. KELLOGG, Primary Examiner

U.S. Cl. X.R.

65—163, 349; 198—23, 76